Aug. 18, 1970  K. F. HALL  3,524,572

FISH POLE CARRIER

Filed Nov. 24, 1967  2 Sheets-Sheet 1

INVENTOR.
KENNETH F. HALL

BY *McGrew & Edwards*

ATTORNEYS

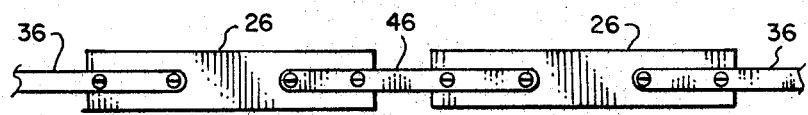
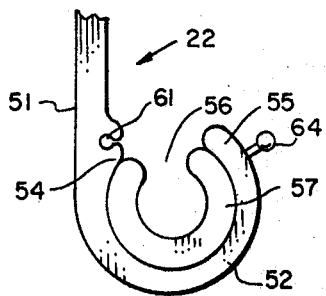
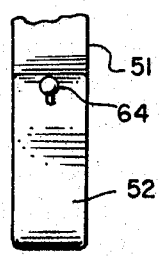
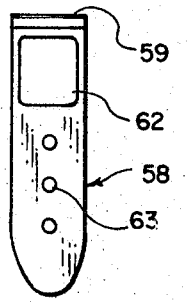
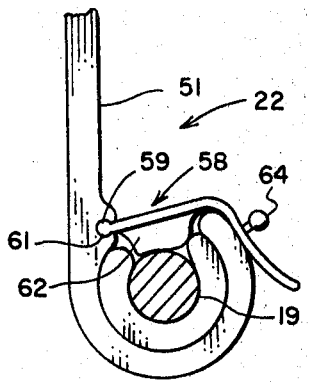
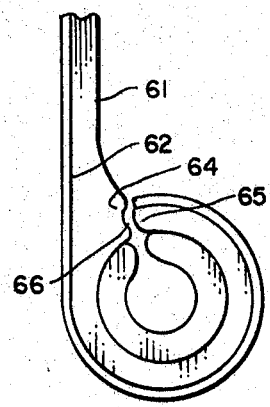
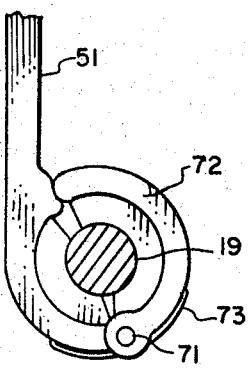
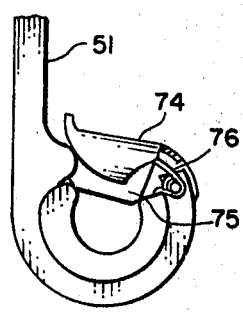

United States Patent Office 3,524,572
Patented Aug. 18, 1970

3,524,572
FISH POLE CARRIER
Kenneth F. Hall, 9205 W. 73rd Place,
Arvada, Colo. 80002
Filed Nov. 24, 1967, Ser. No. 685,381
Int. Cl. B60r 9/04
U.S. Cl. 224—42.1    6 Claims

ABSTRACT OF THE DISCLOSURE

Fish pole carrier inclusive of one or a plurality of spaced cooperative forward and rearward holder members arranged for mounting on stationary surface. Each forward holder member having one or plurality of tubular portions slidably mounted on body portion to receive and support forward end of pole. Each rear holder member alined with forward member and including one or plurality of depending hook-like portions secured at one end on a body. Hook-like portion projecting outwardly and upwardly to provide seating surface for a fish pole. Opposing inturned portions having surfaces in overhanging relation to seating surface to define slot through which pole is inserted onto said seating surface. Rear holder member having cover portion for closing portion of said slot after pole insertion exerting downward forces against pole during transport. Detachable mounting means for securing holder members on vehicle transport top interiorly of vehicle or on storage wall surface.

---

This invention relates to improvements in carriers for fish poles and the like during transport from one location to another and elevated storage when not in use.

Fishing poles with the reel and line and other associated gear, such as hooks and the like, provide a somewhat bulky and cumbersome assembly for moving from location to location. Such fishing poles and associated gear may be easily damaged if they are dropped or stepped on, which may easily occur if such poles are positioned on the floor of a motor vehicle. When fishing poles are carried on a vehicle floor during transport or on a like surface during storage, they take up a considerable amount of space and the reel is exposed to dirt and similar foreign matter which impairs its efficiency. Further, when moving a distance from one fishing location to another, it is sometimes quite inconvenient and difficult to position a fishing pole in a vehicle without tangling the line or damaging the associated fishing gear.

Accordingly, it is an object of this invention to provide a simple, durable and convenient carrier for one or a plurality of fish poles.

Another object of this invention is to provide a fish pole carrier which is particularly suitable for support from a surface such as the top or ceiling of a station wagon or camper or like motor vehicle for transport interiorly thereof which may also be used to support the pole from a side wall, ceiling or like surface for pole storage during the off season.

A further object of this invention is to provide a fish pole carrier which is easily adjustable to accommodate fishing poles of various lengths and diameters and will adjust to various surface contours upon which it is mounted.

Still a further object of this invention is to provide a fish pole carrier in which the fish pole is firmly held so as to avoid damage such as pole, eye or reel breakage during transport from one location to another and facilitates reel cleanliness.

It is yet another object of this invention to provide a fish pole carrier which allows the pole to be assembled and ready for fishing and may be positioned out of the way enroute so as not to interfere with the usual passenger movement in a transport vehicle.

Other objects, advantages and capabilities of the present invention will be more apparent from the following description taken in conjunction with the drawings in which:

FIG. 7 is a top plan view of another form of multiple pole arrangement depicting two holder assemblies secured in an end to end relationship providing a four pole support capability;

FIG. 8 is an end elevation view of a preferred form of depending hook-like portion of a rear holder member shown in FIG. 1;

FIG. 9 is a side elevation view of the rear holder member portion of FIG. 8;

FIG. 10 is an elevation view of the strap or fastening member for the holder portion of FIG. 8;

FIG. 11 is an end elevation view of a holder member shown in FIG. 8 with a detachable fastening member mounted thereon with pole inserted and held;

FIG. 12 is an end elevation view of another form of rear depending holder portion member embodying features of my invention using an outer pliable cover of spring steel for tension and formed with a narrower slot than the arrangement of FIG. 8;

FIG. 13 is an end elevation view of an alternative form of rear depending holder portion using a spring biased holding member; and FIG. 14 is an end elevational view of yet another form of rear depending holder portion embodying features of my invention also using a spring biased holding member.

Figure 1:
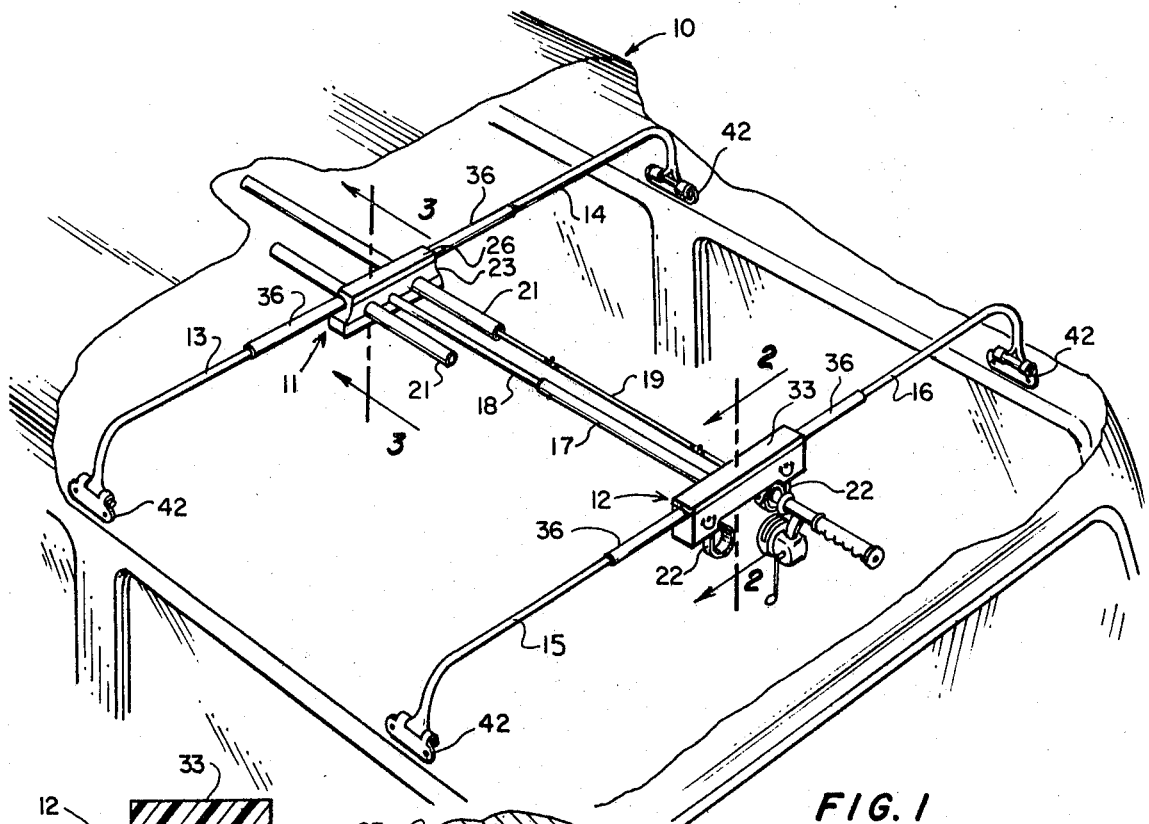
FIG. 1 is a perspective view of a fish pole and pole carrier embodying features of my invention mounted in an overhead position on the top of a station wagon type motor vehicle interiorly thereof as viewed from the rear with portions of the top broken away to show interior parts.
Figure 2:
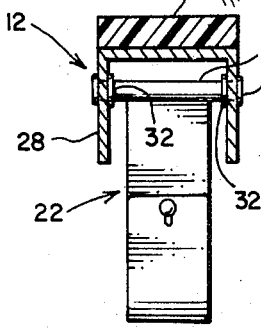
FIG. 2 is a sectional view taken along lines 2—2 of FIG. 1 of the rear holder member showing pivotal support of its depending hook-like portion.

Referring now to the drawing in FIG. 1, there is shown a multiple fishing pole carrier assembly mounted on the top or ceiling interiorly of a transport vehicle 10 such as a station wagon illustrated in fragmentary form. Various types of passenger transport vehicles are contemplated such as campers, trailers and the like.

As shown, the fishing pole carrier in general comprises spaced front and rear holder members or carrier sections 11 and 12 mounted in adjoining relation to the ceiling of the transport vehicle 10 by front left and right side arms 13 and 14 associated with the front holder member and left and right side arms 15 and 16 associated with the rear holder member 12 which are shaped to the contour of the ceiling and are fixedly secured to the vehicle above the windows as described more fully hereafter. The front and rear holder members 11 and 12 are interconnected or joined by longitudinal telescoping members 17 and 18 to adjust for vehicles and poles of different lengthwise dimensions. While the side arms 13, 14, 15 and 16 curved to the contour of the top of the vehicle and attached at their outer ends have been shown as one form of securing the front and rear pole holder members 11 and 12 to the top of the vehicle, it is understood that various other fastening arrangements may be utilized to perform this mounting or fastening function for members 11 and 12 within the spirit and scope of the present invention.

Figure 3:
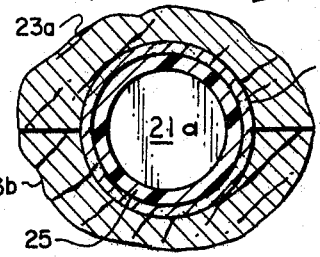
FIG. 3 is a sectional view taken along lines 3—3 of FIG. 1 drawn to an enlarged scale showing the forward tubular member.

The support for a pole 19 shown in position on the forward holder member 11 inclusive of an elongated tubular portion 21 in which the forward end of the pole is inserted and the rear holder member 12 includes a depending hook-like portion 22 in an aligned relation with the tubular portion 21 on which a rear portion of the pole is seated. In the two pole support assembly as shown in FIG. 1, the front holder member 11 includes a pair of spaced tubular portions 21 mounted in a body 23 split or formed of an upper piece 23a and a lower piece 23b (FIG. 3). The upper piece is formed with a pair of spaced semicircular recessed portions and the lower piece with a pair of spaced semicircular recessed portions with opposing sets of upper and lower portions receiving a tubular portion 21. Fasteners 24 such as a plurality of screws hold the upper and lower pieces in abutting relation as shown with the recessed portions engaging the outer surface of the tubular portions 21 to hold the tubular portions against movement. When the fasteners 24 are loosened, the tubular portions 21 may be moved lengthwise of the carrier to further adjust the spacing between supporting surfaces for poles of different lengths.

One preferred construction for the tubular portion 21 is to provide an outer tube of metal, rigid plastic or the like having a liner or layer 25 on its inner surface of a soft plastic rubber material or the like to furnish added cushioning of the pole as illustrated in FIG. 3. The length of this tubular portion is sufficient to provide substantial surface contact with the pole and prevent undue vibration of the small end portion during transport which may otherwise damage the pole.

Another suitable construction for tubular portion 21 is that of only a soft pliable plastic material having sufficient rigidity to support the pole. The forward end of tubular portion 21 is positioned to extend beyond the tip of the pole and is preferably closed by an end wall 21a to guard the tip and avoid having the eyelets extend beyond the tubular portion which may result in the eyelets engaging the end of the tubular portion if open and the pole extended forwardly thereof upon removal of the pole from the carrier. Pole vibration is also reduced by having the tubular portion 21 extend forwardly of the tip of the pole. A pad or cushion member 26 is preferably disposed on the top surface of the top piece 23a to provide a cushion effect between the carrier assembly and the ceiling of the transport vehicle and such padding on top prevents damage to the interior of the vehicle.

The rear holder member 12 for a two pole support assembly includes a pair of depending hook-like portions 22, each being alined with one of the forward tubular portions 21 and pivotally mounted in a common U-shaped body or frame 28 disposed in an inverted manner to pivot in either direction as indicated by arrows. The mounting for the hook-like portion includes a sleeve or bushing portion 29 at its upper end which fits over a bolt 31 extending through the depending arm portions of frame 28 so as to pivotally support the hook-like portion. A friction means 32, such as nylon friction rings or washers, is disposed between the bushing and inner surface of the frame arm so as to provide a drag on the depending hook portion in its pivotal movement. When not in use, the hook portion may be pivoted in either direction as indicated by arrows to an upward position where it is covered by the depending arms of the frame 28 or positioned at various angles when the carrier is mounted on an inclined storage surface. A pad or cushion member 33 is disposed on the top surface in a manner similar to that of the front holder for the same purpose.

Figure 5:
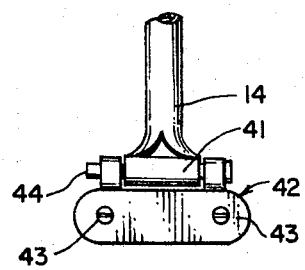
FIG. 5 is a fragmentary elevation view of the lower end of the mount as shown in FIG. 1 which attaches to the side of the vehicle.
Figure 4:
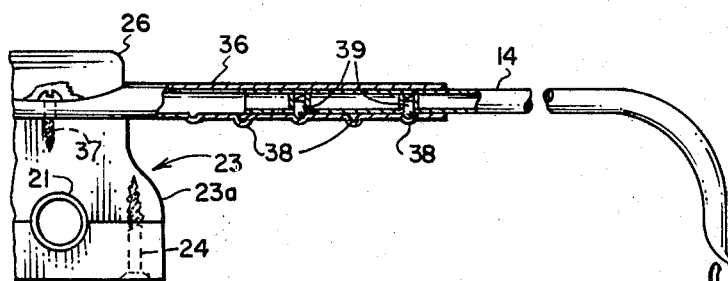
FIG. 4 is an elevational view showing a fragment of the forward holder member having an adjustable mounting arrangement with exterior surfaces partially broken away for supporting the holder member from the upper sides of a station wagon or like vehicle as shown in FIG. 1.

A preferred form of mounting both the forward and rear holder members 11 and 12 on a vehicle such as a station wagon will now be described with reference to the forward right side arm 14 illustrated in more detail in FIGS. 4 and 5, which mounting is the same for the other arms 14, 15 and 16 so that a description of one applies equally to all.

An elongated socket-like member preferably of a metal tubular material is detachably mounted on the upper surface of top piece 23a as by a fastener, such as screws 37. The inner end portion of the socket-like member 36 through which the screws 37 extend may be flattened as shown. Socket member 36 projects outwardly from the end of the body 23 and is provided with a plurality of spaced recessed portions 38. Arm 14 is also formed preferably of metal tubing and has an inner end portion which telescopes within the socket member 36 and has a plurality of spaced spring biased button-like members 39 which seat in the recessed portions 38 so as to hold the arm at one of a plurality of settings. In this manner, the length of arms 14 may be adjustable to accommodate for vehicles of different widths and also decrease the width of the carrier when additional holder assemblies are employed in a manner as hereafter described with reference to FIG. 7. In the event the vehicle has a top of irregular contour such as may occur in a camper, the length of the depending portions of these arms may be changed to support the pole in an essentially horizontal position.

The outer portion of arm 14 curves downwardly to fit the contour of the vehicle top or ceiling and terminates in its lower end in a sleeve portion 41. Sleeve portion 41 fits in a bracket 42 (FIG. 5) attached to the side wall or window frame of the vehicle by fasteners 43 such as metal screws or the like above the window. The bracket 42 is formed so that a pin member 44 will slide through the bracket and sleeve portion 41 and lock the end of the arm thereto. Slidable removal of the pin 44 will thereby facilitate removal of the arm 14 from the vehicle.

Figure 6:
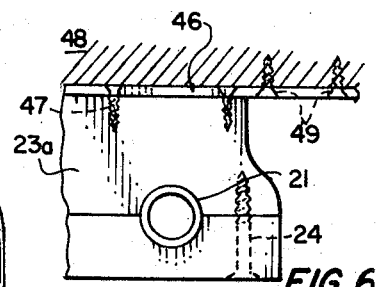
FIG. 6 is an elevational view showing a fragment of the forward holder assembly secured to a stationary surface which may be horizontal, inclined or vertical depicting an off-season storage capability.

For off season storage or for direct fastening to a vehicle surface of fishing poles, the socket members 36 are removed from each side of the front and rear holder assemblies 11 and 12 by demounting fasteners 37. Various attachment devices such as a plate 46 having a plurality of spaced apertures at each end is then secured to the upper piece by fasteners 47, such as screws, which extend beyond the upper piece. The extension of the plate engages a support surface such as a ceiling or similar elevated storage surface 48 and a plurality of fasteners 49 fit into the surface 48 as is depicted in FIG. 6. If support surface 48 is inclined or vertical, the hook-like portions 22 will pivot on member 31 to a suitable angle to provide a seating surface for the rearward portion of the pole.

Referring now to FIG. 7, when additional pole support is required, the plate 46 may be used to join a second body 26 at the front in an end to end relation which cooperates with a pair of similarly joined frames 28 at the rear (not shown) so that the carrier will then support four poles.

Referring now to FIGS. 8–11, there is shown in more detail a preferred construction for the hook-like portion or member 22 of the rear holder member. Member 22 comprises an elongated shank portion 51 pivotally secured at its upper end as above described, and a hook portion 52 projecting outwardly and upwardly from the shank portion to form an upper seating surface for a pole and opposing inturning portions 54 and 55 having surfaces in overhanging relation to said seating surface and defining a slotted portion 56 through which the pole is inserted. A C-shaped cushion or pad member 57 is preferably fitted on the inner surface of the hook portion 52 to form the actual seating surface for the pole.

A strap member 58 is provided for closing the slotted portion 56 which includes a beaded male coupling portion 59 at one end which fits into a female coupling portion 61 formed on the shank portion having a padded member 62 which extends downwardly into the slot to engage the top of the pole 19. The strap member 58 has a plurality of apertures 63 for length adjustment, each of which will fit over an outwardly projecting knot-like member or button 64. In this manner, downwardly directed forces are exerted against the top of the pole to hold the pole against lateral movement after insertion of the pole into the slot as shown in FIG. 11 and hold the pole in various horizontal inclined and vertical positions.

In an alternative form of rear pole holder member as shown in FIG. 12, the inner hook-like member may be formed having an inner layer 61 of a more resilient material such as pliable plastic and a metal outer band, strip or layer 62 for reinforcement, preferably of spring steel. In this form, the inturned portions 64 and 65 are extended from that shown in FIG. 8 so as to narrow the slotted portion 66 and the cushion member 57 is extended so as to encompass more of the periphery of the pole. The insertion of the pole through the slot separates the inturned portions with the inturned portion of the hook extension being sufficiently pliable to return and cover a major portion of the pole and hold it therein.

In the alternative forms shown in FIGS. 13 and 14, the inturned portion of the hook is constructed of a spring biased arrangement. As shown in FIG. 13, the pivot point 71 of the inturned portion 72 is at a lower portion of the hook with a spring 73 or the like biased to hold it in position. Removal of the pole 19 requires pivotal movement of the inturned portion 72. As shown in FIG. 14, the inturned portion 74 extends substantially across the top of the hook and is provided with an inner pad 75 which exerts a downwardly directed force on the pole. The spring 76 biases the inturned portion about the top of the pole.

Although specific embodiments of my invention have been illustrated, various modifications may occur to those skilled in the art. Therefore, I do not desire my invention to be limited to the specific details illustrated and described and I intend by the appended claims to cover all modifications to fall within the spirit and scope of this invention.

I claim:
1. A fish pole carrier comprising spaced forward and rear cooperative holder members adapted to be supported for engaging the forward tapered portion and rear handle portion of a fish pole, said forward holder member including an elongated tubular body of a length to encompass the terminal end of the fish pole and extend a distance substantially inwardly of the terminal end along the pole and into which the forward end of the pole is slidably inserted and disposed in a loose-fitting relationship and means for supporting said tubular body, said rear holder member having a releasable grip means including a slotted socket portion for insertion of the rear handle portion with opposing pole-engaging surfaces extending beyond a semi-circular section shaped to generally conform to the contour of the rear handle portion and a clamp-down member with a resiliently padded pole-engaging surface, said releasable clamp-down member being releasable to permit the pole to be placed in the socket portion and arranged to close the slot and bear against the handle portion generally oppositely of the socket portion to force the handle portion in a frictional engagement against the socket portion to firmly hold the fish pole in place, said forward holder member engaging a substantially greater length of the pole than said rear holder member.

2. A fish pole carrier as set forth in claim 1 wherein said tubular body is slidable on its support means for movement toward and away from the rear holder member to adjust for fish poles of different lengths.

3. A fish pole carrier as set forth in claim 1 wherein the interior of said tubular body is a resilient material.

4. A fish pole carrie as set forth in claim 1 wherein said clamp-down member is a hinged section adapted to swing open to permit placement of the fish pole on the socket portion, said clamp-down member being biased to swing closed to frictionally engage the fish pole.

5. A fish pole carrier as set forth in claim 1 wherein said clamp-down member includes a demountable strap with said resilient padded surface arranged to bear against the pole and means to releasably secure the strap in place.

6. A fish pole carrier comprising spaced cooperative holder members formed for engaging a forward and rearward portion of at least one pole to support said pole in a depending manner therefrom, one of said holder members including at least one tubular portion into which the forward end of said pole is disposed, the other of said holder members including at least one depending hook-shaped portion aligned with said tubular portion providing a seating surface and having a slot through which the rearward portion of the pole is inserted onto said seating surface, and means for mounting said holder members on an overhead support surface, said mounting means for each of the holder members including a pair of outwardly extending tubular arms shaped to the contour of the vehicle top and arranged for attachment at their outer end portion to the window frame, said holder member including a tubular socket portion extending outwardly from each end into which the end of one of said tubular arms fit into a telescoping relationship to vary the effective length of the mounting assembly for lengthwise adjustment.

References Cited
UNITED STATES PATENTS

| | | | |
|---|---|---|---|
| 672,540 | 4/1901 | Speir | 224—42 X |
| 1,914,259 | 6/1933 | Irwin | 211—64 X |
| 2,552,293 | 5/1951 | Page et al. | |
| 2,578,067 | 12/1951 | Jensen | 224—42.1 X |
| 2,854,147 | 9/1958 | Derr | 211—60 |
| 2,907,506 | 10/1959 | Sammons | 224—42.45 X |
| 2,946,452 | 7/1960 | Caloiero et al. | 211—64 X |
| 2,983,414 | 5/1961 | Fehr | 224—42.1 |
| 2,988,252 | 6/1961 | Crane | 224—42.1 |
| 3,155,299 | 11/1964 | Horne et al. | 224—42.1 |
| 3,209,918 | 10/1965 | Farrell | 211—68 |
| 3,291,427 | 12/1966 | Hutchings | 211—60 X |

GERALD M. FORLENZA, Primary Examiner

U.S. Cl. X.R.

224—42.46; 211—60